US012701504B2

(12) United States Patent
Agami et al.

(10) Patent No.: US 12,701,504 B2
(45) Date of Patent: Aug. 4, 2026

(54) RESIDENTIAL MOBILE WIRELESS HIGH SPEED DATA ACCESS VIA MILLIMETER WAVE CUSTOMER PREMISE EQUIPMENT

(71) Applicant: T-MOBILE INNOVATIONS LLC, Overland Park, KS (US)

(72) Inventors: Gregory Agami, Arlington Heights, IL (US); Kyle Edwin Bedtelyon, Park Ridge, IL (US); Ahmed Mohamed Osman, Inverness, IL (US); Narothum Saxena, Hoffman Estates, IL (US); Michael S. Irizarry, Barrington Hills, IL (US)

(73) Assignee: T-Mobile Innovations LLC, Overland Park, KS (US)

( * ) Notice: Subject to any disclaimer, the term of this patent is extended or adjusted under 35 U.S.C. 154(b) by 294 days.

(21) Appl. No.: 18/381,296

(22) Filed: Oct. 18, 2023

(65) Prior Publication Data

US 2024/0137859 A1     Apr. 25, 2024
US 2024/0236842 A9     Jul. 11, 2024

Related U.S. Application Data

(60) Provisional application No. 63/417,520, filed on Oct. 19, 2022.

(51) Int. Cl.
*H04W 52/00*     (2009.01)
*H02J 7/92*     (2026.01)
(Continued)

(52) U.S. Cl.
CPC ............... *H04W 52/00* (2013.01); *H02J 7/92* (2026.01); *H02J 7/96* (2026.01); *H04W 84/042* (2013.01)

(58) Field of Classification Search
CPC ... H04W 52/00; H04W 84/042; H04W 84/12; H02J 7/0071; H02J 7/007182
See application file for complete search history.

(56) References Cited

U.S. PATENT DOCUMENTS 10,181,896 B1 *   1/2019  Swift ................. H04B 7/18519
2018/0157001 A1 *   6/2018  Gu ....................... H04B 10/114
(Continued)

*Primary Examiner* — Abdullahi Ahmed
(74) *Attorney, Agent, or Firm* — Shook, Hardy & Bacon L.L.P.

(57)          ABSTRACT
Providing high speed Internet access via millimeter wave signal transmissions between a customer premises and a radio access network (RAN) node of a millimeter wave signal wireless data network service provider is described. An external customer premises equipment (CPE) is configured for operation while mounted exterior to a customer premises and configured to operate as a relay node between the RAN node and an internal local communication node within the customer premises. The CPE includes a millimeter wave modem component providing a millimeter wave signal wireless communication link between the CPE and the RAN node, wherein the millimeter wave modem component includes a transmission sub-component operating at a transmission signal power level exceeding a transmission signal power limit for internal power signal transmissions of millimeter wave signals. The CPE further includes a Wi-Fi modem component providing a Wi-Fi signal wireless communications link between the CPE and the internal local communication node within the customer premises.

20 Claims, 1 Drawing Sheet

(51) Int. Cl.
    *H02J 7/96*        (2026.01)
    *H04W 84/04*     (2009.01)

(56)                References Cited

U.S. PATENT DOCUMENTS

| | | | |
|---|---|---|---|
| 2019/0069245 A1* | 2/2019 | Miller | A61B 5/742 |
| 2019/0312807 A1* | 10/2019 | Lipowski | H04W 84/12 |
| 2020/0106582 A1* | 4/2020 | Jalali | H04B 17/318 |
| 2021/0234592 A1* | 7/2021 | Ashrafi | H01Q 21/065 |
| 2023/0379840 A1* | 11/2023 | Wang | H04L 5/0073 |
| 2024/0251256 A1* | 7/2024 | Cavcic | H04B 17/3912 |

* cited by examiner

RESIDENTIAL MOBILE WIRELESS HIGH SPEED DATA ACCESS VIA MILLIMETER WAVE CUSTOMER PREMISE EQUIPMENT

CROSS-REFERENCE TO RELATED APPLICATIONS

This application is a non-provisional of U.S. Provisional Patent Application No. 63/417,520, filed on Oct. 19, 2022, entitled "RESIDENTIAL MOBILE WIRELESS HIGH SPEED DATA ACCESS VIA MILLIMETER WAVE CUSTOMER PREMISE EQUIPMENT," the contents of which are hereby incorporated by reference in their entirety.

FIELD OF THE INVENTION

The present disclosure generally relates to mobile wireless high speed data communications. More particularly, the present disclosure is directed to physical arrangements for wireless transceiver equipment supporting residential mobile wireless high speed data access.

BACKGROUND OF THE INVENTION

High speed Internet access is typically provided to free-standing residential structures via physical transmission lines that are fed through a wall of a residence. Regardless of whether provided via optical fiber, coaxial cable, or copper wire, a typical installation involves drilling a hole within a wall or roof of a residence and feeding the physical transmission line through the hole. Such arrangement involves a significant amount of physical labor that must be performed by a trained technician.

Use of physical transmission lines to provide an interface within residences presents a number of problems. The significant amount of physical work that is typically needed to provide a physical transmission line to a residential wireless router discussed above is performed by trained technicians. As a result, residential customers encounter time delays and need to be present while the trained technician performs the aforementioned physical installation provision of a physical transmission line within a residential building.

The introduction of 5G wireless technology presents an opportunity to supplement legacy physical transmission line-based residential Internet access by high speed wireless internet access. More particularly, the millimeter wavelength signal spectrum used by 5G wireless technology supports high speed data rates on the order of Gigabits per second. However, the substantially lower wavelength (higher frequency) electromagnetic signal utilized by 5G technologies experiences significant signal attenuation when passing through residential structure walls. The high attenuation essentially precludes residential users from experiencing the theoretically superior data rates supported by 5G wireless carriers indoors.

A known solution to the problem of high signal attenuation (low signal penetration) by millimeter wavelength electromagnetic signals in a 5G fixed wireless access arrangement for residential Internet access is schematically depicted in FIG. 1. In this case, a consumer premises equipment (CPE) 101, including a 5G antenna, is mounted on an exterior of a residential customer home 102. In the illustration, the CPE 101 is mounted on a roof of the home 102 to provide a line-of-sight path between the 5G antenna and a radio access network (RAN) antenna 103 of a 5G base station (gNodeB, gNB) of a 5G wireless service carrier. With continued reference to FIG. 1, the CPE 101 is configured to operate as a relay node that is signally connected via a multi-gigabit ETHERNET cable 104 to a Wi-Fi (802.11) router 105 operating as a wireless hotspot/hub providing wired/wireless Internet access for user terminals 106, 107 and 108 in the vicinity of the router 105 inside the home 102. The CPE 101 includes electronic circuitry that receives power from a power over ETHERNET (PoE) injector 110 via the Ethernet cable 104.

While able to provide high speed Internet access without a physical link between the home 102 and a physical Internet subnetwork node, the wireless access connectivity summarized in FIG. 1 exhibits the need to drill a hole through an exterior wall or roof of the home 102 through which the Ethernet cable 104 passes (or alternatively passing flat cabling through a window gap.

While boosting power of the 5G signal of transmitters/antennas within homes and corresponding 5G radio access network interfaces appears to be a straight-forward solution that would avoid a need to provide the above-described CPE 101 external to the home 102, such increase in signal power is precluded by Federal Communications Commission (FCC) regulations that limit indoor mmWave devices to 43 dBm (well below the 55 dBm limit for outdoor devices). Thus, while an interior-positioned 5G transceiver may be able to receive a downlink signal with sufficient power, uplink data transfers and control signaling are substantially limited by the aforementioned power limits for indoor transmitters.

SUMMARY OF THE INVENTION

An arrangement is disclosed for providing high speed Internet access via millimeter wave signal transmissions between a customer premises and a radio access network (RAN) node of a millimeter wave signal wireless data network service provider. The arrangement includes an external customer premises equipment (CPE) configured for operation while mounted exterior to a customer premises and configured to operate as a relay node between the RAN node and an internal local communication node within the customer premises.

The CPE includes a millimeter wave modem component configured to provide a millimeter wave signal wireless communication link between the CPE and the RAN node, wherein the millimeter wave modem component includes a transmission sub-component operating at a transmission signal power level exceeding a transmission signal power limit for internal power signal transmissions of millimeter wave signals. The CPE further includes a Wi-Fi modem component configured to provide a Wi-Fi signal wireless communications link between the CPE and the internal local communication node within the customer premises.

The arrangement further includes an external power supply configured to provide power to enable uninterrupted power meeting peak power needs of the CPE.

In accordance with the disclosure, the CPE is configured to operate at a transmission signal power level exceeding indoor transmission signal power limitations established by government regulation.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 1 is a schematic diagram of a known arrangement for providing improved high speed Internet access to residential 5G service customers via an externally mounted consumer premises equipment (CPE) wireless transceiver node; and FIG. 2 is a schematic diagram of an arrangement for providing self-installed high speed 5G Internet access to residential 5G service customers via an externally mounted CPE wireless transceiver node in accordance with the present disclosure.

DETAILED DESCRIPTION OF THE DRAWINGS

A millimeter wavelength (e.g. 5G) residential wireless Internet access arrangement is described herein with reference to FIG. 2 that enables reliable wireless access to the Internet via millimeter wavelength signal transmission between a CPE 201 mounted on an exterior of a home 202 and a radio access network (RAN) antenna 203 of a 5G base station (gNodeB, gNB) of a 5G wireless service carrier.

In accordance with the illustrative example depicted in FIG. 2, the CPE 201, including a 5G antenna, is mounted on an exterior (e.g. roof or wall) of the home 202 of a residential customer, thus providing a line-of-sight transmission path between the 5G antenna of the CPE 201 and a radio access network (RAN) antenna 203 of a 5G base station (gNodeB, gNB) of a 5G wireless service carrier. With continued reference to FIG. 2, the CPE 201 is configured to operate as a relay node that is signally connected via Wi-Fi (802.11) link (as opposed to an Ethernet cable as shown in FIG. 1) to an internal local communication node 205 (e.g., a Wi-Fi router, mesh node, etc.) that operates as a wireless hotspot/hub providing wired/wireless Internet access for user terminals 206, 207 and 208 in the vicinity of the internal local communication node 205 inside the home 202.

In contrast to the CPE 101 of FIG. 1, the CPE 201 of the present disclosure includes both a 5G modem component 211 and Wi-Fi modem component 212, and associated antennas that enable the CPE 201 to operate as a fully-wireless relay node between the RAN antenna 203 of the 5G base station and the internal local communication node 205. The Wi-Fi modem component 212 provides a high speed relatively short distance high speed connectivity to the internal local communication node 205 (e.g., a Wi-Fi router, mesh node, etc.) and any other components of a home-based Wi-Fi mesh network. By way of a particular example, the Wi-Fi modem component 212 incorporates/operates under Wi-Fi 5 and Wi-Fi 6 protocols supporting multi-gigabit throughputs using unlicensed 2.4 GHz, 5 GHz, and/or 6 GHz spectrum, which have favorable propagation properties through physical walls compared, to 5G millimeter wave signals.

Importantly, the 5G modem component 212 is configured for outdoor operation, thereby permitting transmissions in accordance with outdoor power signal power limitations (e.g., 55 dBm per FCC guidelines)—as opposed to the significantly lower power limitations (e.g. 43 dBm per FCC guidelines). This is an important distinction from indoor CPE equipment including power-limited 5G radio transmissions that suffer from substantial signal degradation that prevents, in many instances, effective high-speed (Gigabit) data access within a residential structure.

A further aspect of the residential high-speed millimeter wave (e.g., 5G) radio access scheme of the present disclosure is providing power to the CPE 201. The absence of the Ethernet cable 104 of prior systems precludes use of power over ETHERNET. In the absence of the Ethernet cable 104, it is contemplated to provide power to the CPE 201 via any of a variety of sources that do not require power via a physical line originating from within the home 202. One possibility is use of a 120V external power outlet. Alternatively, a solar-powered rechargeable battery is utilized to power the CPE 201. A further embodiment utilizes a power supply originating from within the home 202 (e.g., a wall outlet) and having a power line terminating at an inductive power source pad of an inductive interface that is installed at a window. The inductive interface includes a source (inductive coil) pad mounted on an interior surface of a window and a receiving (inductive coil) pad mounted on an exterior surface of the window. The receiving pad is connected to an external power supply line providing power to the CPE 201.

In an illustrative example, the external power supply line is connected to a re-chargeable battery. The re-chargeable battery is connected to provide power to the CPE 201 to ensure a continuous power supply capable of handling any transient peak power needs of the CPE 201—even in cases where the peak power provided by the inductively coupled power line does not meet the peak power demand of the CPE 201. Software running on the CPE 201 is also provided to throttle data throughputs as needed to reduce power consumption and extend operation time, in an arrangement utilizing a re-chargeable battery and an alternative non-continuous power source, if battery levels fall under a given threshold. Software on the CPE 201 is also provided to reduce power consumption based on time of day, in accordance with known (e.g., through observation of historical use) periods of lower data usage. Such power management is advantageously incorporated into operation of the CPE 201 to facilitate reserving power for times when higher data usage is expected.

Moreover, artificial intelligence/machine learning (AI/ML) techniques and functionality are also incorporated into operation of power management schemes carried out by the CPE 201. In such cases, the artificial intelligence/machine learning techniques are utilized to configure operating modes of the CPE 201 in accordance with predicted power availability and usage patterns, to manage power consumption based on historical battery utilization to increase the overall available operation time of the CPE 201 being powered by a source that uses an alternative non-continuous power source in combination with a rechargeable battery.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An arrangement for providing high speed Internet access via millimeter wave signal transmissions between a customer premises and a radio access network (RAN) node of a millimeter wave signal wireless data network service provider, wherein the arrangement comprises:

an external customer premises equipment (CPE) including a single millimeter-wave transceiver located entirely exterior to the customer premises, configured for operation while mounted exterior to a customer premises and configured to operate as a relay node between the RAN node and an internal local communication node within the customer premises, wherein the CPE comprises:

a millimeter wave modem component configured to provide a millimeter wave signal wireless communication link between the CPE and the RAN node, wherein the millimeter wave modem component includes a transmission sub-component operating at a transmission signal power level exceeding a transmission signal power limit for internal power signal transmissions of millimeter wave signals; and a Wi-Fi modem component configured to provide a Wi-Fi signal wireless communications link between the CPE and the internal local communication node within the customer premises, wherein the Wi-Fi modem component provides a wireless communication path between the external CPE and the internal local communication node; and an external power supply configured to provide power to enable uninterrupted power meeting peak power needs of the CPE, wherein the CPE is configured for outdoor operation with transmissions in accordance with outdoor transmission signal power limitations to lawfully exceed indoor transmission signal power limitations established by government regulation, and wherein no millimeter-wave transmissions occur within an interior of the customer premises.

2. The arrangement of claim 1 wherein the internal local communication node is a Wi-Fi router.

3. The arrangement of claim 1 wherein the internal local communication node is a mesh node.

4. The arrangement of claim 1 wherein the external CPE is configured to communicate wirelessly with the RAN node according to 5G wireless protocols.

5. The arrangement of claim 1 wherein the external CPE is configured to communicate wirelessly with the RAN node by transmitting with an electromagnetic signal power exceeding 43 dBm.

6. The arrangement of claim 5 wherein the external CPE is configured to communicate wirelessly with the RAN node by transmitting with the electromagnetic signal power being below 55 dBm.

7. The arrangement of claim 1 wherein the external CPE is configured to operate using a non-continuous power supply.

8. The arrangement of claim 7 wherein the non-continuous power supply comprises a solar panel.

9. The arrangement of claim 8 wherein a rechargeable battery is connected to supply power to the external CPE in the absence of power supply from the solar panel.

10. The arrangement of claim 9 wherein the rechargeable battery is charged by a current provided by the solar panel.

11. The arrangement of claim 1 wherein the external CPE is configured to operate using power supplied by a 120 V alternating current power outlet.

12. The arrangement of claim 1 wherein the external CPE is configured to operate using power supplied by a current provided via an inductive power coupling at an exterior window.

13. The arrangement of claim 1 wherein the external CPE is powered, at least in part, by a rechargeable battery and an interruptible power supply.

14. The arrangement of claim 13, wherein the external CPE is configured to operate in a low-power mode where data rate is reduced in accordance with a power management scheme.

15. The arrangement of claim 14, wherein the external CPE executes the power management scheme so as to throttle data throughputs as needed to reduce power consumption and extend operation time.

16. The arrangement of claim 15, wherein the power management scheme includes reducing power consumption in accordance with a daily time schedule.

17. The arrangement of claim 16, wherein the daily time schedule includes a time-of-day data rate usage factor.

18. The arrangement of claim 17, wherein a reduced power mode is entered at periods within a day where data rate demand is low.

19. The arrangement of claim 17 wherein a reduced power mode is entered to reserve power for known time periods of high data rate demand.

20. The arrangement of claim 14 wherein the power management scheme is operated in accordance with a trained machine learning scheme.

* * * * *